United States Patent
Wang (10) Patent No.: US 11,619,250 B2
(45) Date of Patent: Apr. 4, 2023

(54) CONNECTING APPARATUS

(71) Applicant: MING YANG ALUMINUM CO., LTD., Xianxi Township (TW)

(72) Inventor: Chuan-Fu Wang, Xianxi Township (TW)

(73) Assignee: MING YANG ALUMINUM CO., LTD., Xianxi Township (TW)

(*) Notice: Subject to any disclaimer, the term of this patent is extended or adjusted under 35 U.S.C. 154(b) by 183 days.

(21) Appl. No.: 17/238,671

(22) Filed: Apr. 23, 2021

(65) Prior Publication Data

US 2022/0341451 A1 Oct. 27, 2022

(51) Int. Cl.
*F16B 7/04* (2006.01)

(52) U.S. Cl.
CPC .................. *F16B 7/0473* (2013.01)

(58) Field of Classification Search
CPC ...... F16B 7/0473; F16B 7/046; F16B 7/0466; F16B 2200/20; F16B 2200/205; F16B 2200/30; F16B 2200/40
See application file for complete search history.

(56) References Cited

U.S. PATENT DOCUMENTS

| | | | |
|---|---|---|---|
| 3,811,785 A * | 5/1974 | Hagglund | F16B 7/0453 403/231 |
| 4,360,286 A * | 11/1982 | Beer | F16B 7/0473 403/201 |
| 5,143,474 A * | 9/1992 | Vieler | F16B 7/046 403/252 |
| 6,106,183 A * | 8/2000 | Strassle | F16B 7/046 403/252 |
| 6,334,732 B1 * | 1/2002 | Strassle | F16B 5/0685 403/324 |
| 6,402,420 B1 * | 6/2002 | Yang | F16B 12/32 403/381 |

FOREIGN PATENT DOCUMENTS

FR 2519388 A * 7/1983 ............ F16B 7/0473

* cited by examiner

*Primary Examiner* — Daniel J Wiley (74) *Attorney, Agent, or Firm* — Guice Patents PLLC (57) ABSTRACT

A connecting apparatus includes a main body having a first half member and a second half member; the second ends of the two half members configured to open or close relatively to each other; an accommodating cavity formed between the first and second half members; a driving member and an actuating member installed inside the accommodating cavity; the driving member capable of driving the actuating member to move toward the second ends of the two half members to an opened position, thereby expanding the second ends of the two half members outward. The connecting apparatus is installed inside an elongated member, and latch portions on the second ends of the two half members are able to latch onto another elongated member to achieve a connection between elongated members.

15 Claims, 7 Drawing Sheets

CONNECTING APPARATUS

BACKGROUND OF THE INVENTION

1. Technical Field

The present invention is related to a connecting apparatus, and in particular, to a connecting apparatus for connecting elongated members and capable of conveniently connecting elongated members in a 90 degree angle.

2. Description of Related Art

Frames or racks are mostly formed by a multiple number of vertical and horizontal elongated members assembled together. Extrusion member refers to a type of elongated member that can be used to assemble racks or frames.

Vertical and horizontal extrusion members require the use of a connecting apparatus to achieve the connection between different members. A known connecting apparatus cannot be operated easily during the connection of extrusion members. In addition, typical connecting apparatus is also exposed outside the extrusion members, affecting the appealing appearance of the structure.

BRIEF SUMMARY OF THE INVENTION

An objective of the present invention is to provide a connecting apparatus, applicable to connecting vertical and horizontal elongated members (extrusion member/pipe/beam), and capable of securing/connecting horizontally and vertically assembled elongated members quickly.

Another objective of the present invention is to provide a connecting apparatus allowing the connecting apparatus to be concealed inside an elongated member and facilitating the operation thereof conveniently.

To achieve the aforementioned objectives, the present invention provides a connecting apparatus, comprising:

a main body having a first half member and a second half member arranged side by side; each of the two half members having a first end and a second end; the two half members configured to open or close relatively to allow the second ends of the two half members to expand outward; an accommodating cavity formed between the first half member and the second half member; two latch portions formed at the second ends of the two half members respectively;

a driving member and an actuating member installed inside the accommodating cavity; the driving member arranged adjacent to the first ends of the two half members, and the actuating member arranged adjacent to the second ends of the two half members; the driving member configured to drive the actuating member to move, allowing the actuating member to move from a retracted position toward the second ends of the two half members to reach an opened position; when the actuating member located at the retracted position, the two half members remained unopened; when the actuating member moved to the opened position, the second ends of the two half members being opened; and a predetermined number of elastic members having an elastic force capable of maintaining the second ends of the two half members to be closed.

Accordingly, by operating the driving member, the two latch portions of the second ends of the two half members can be controlled to open outward or to close inward.

The connecting apparatus is installed inside an elongated member. The elongated member has a cross-sectional shape of a hollow inner frame and at least a pair of outer flanges facing each other and arranged on at least one side surface of the inner frame. A space is formed between each pair of the outer flanges and the inner frame; and an opening is formed between inner ends of each pair of the outer flanges. The connecting apparatus is installed at one end of the inner frame of the elongated member. The two latch portions expose out of the elongated member in order to latch another elongated member.

Preferably, the first ends of the two half members connected to the inner frame by at least one pivotal member; an operating portion is arranged on the driving member and used to rotate the driving member; an opening hole is formed at a wall of the inner frame and arranged corresponding to the operating portion of the driving member.

Accordingly, the connecting apparatus is concealed inside the elongated member in order to connect the vertical and horizontal elongated members.

BRIEF DESCRIPTION OF THE SEVERAL VIEWS OF THE DRAWINGS

The objectives, features and technical effectives of the present invention can be understood through the description and drawings of the following preferred embodiments.

DETAILED DESCRIPTION OF THE INVENTION

Figure 1:
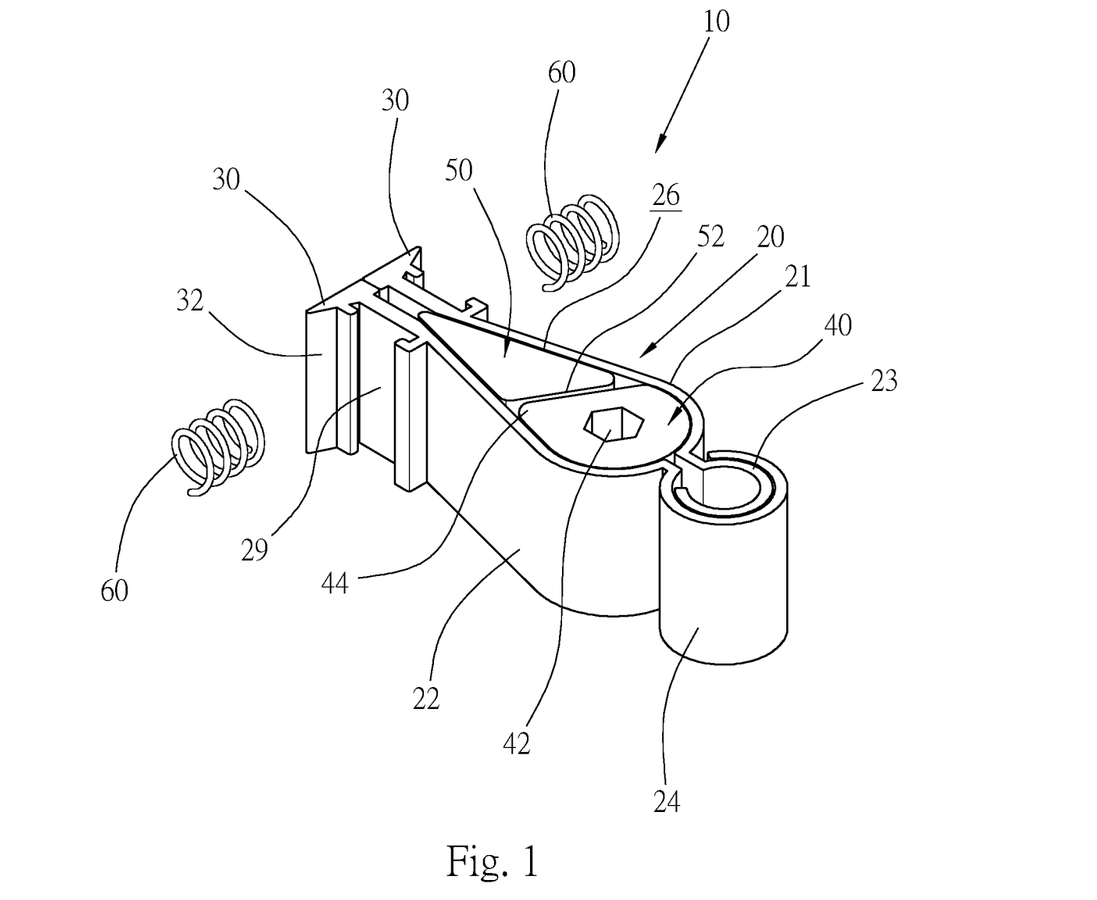
FIG. 1 is a perspective view of a preferred embodiment of the connecting apparatus of the present invention.
Figure 2:
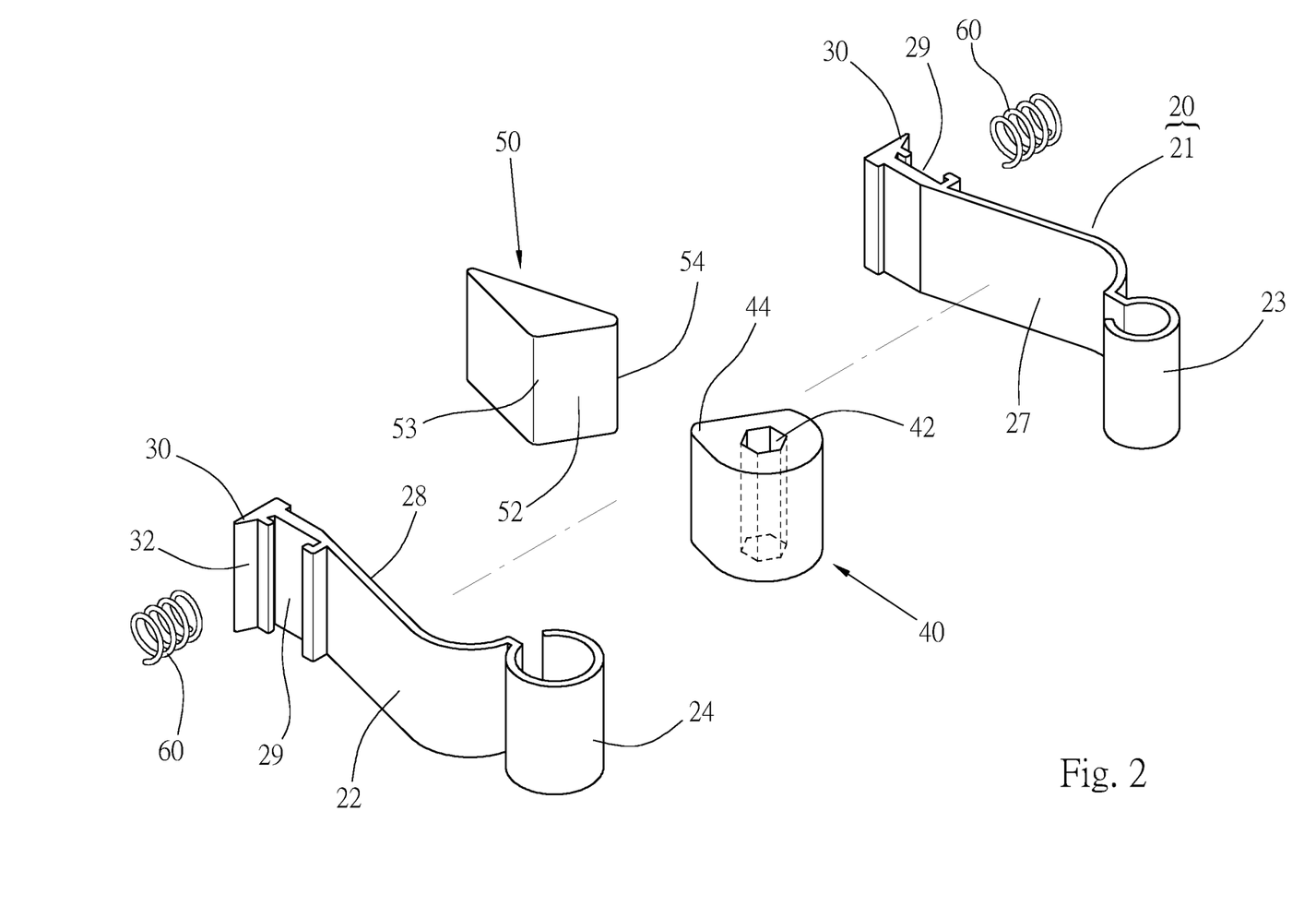
FIG. 2 is an exploded perspective view of a preferred embodiment of the connecting apparatus of the present invention.
Figure 4:
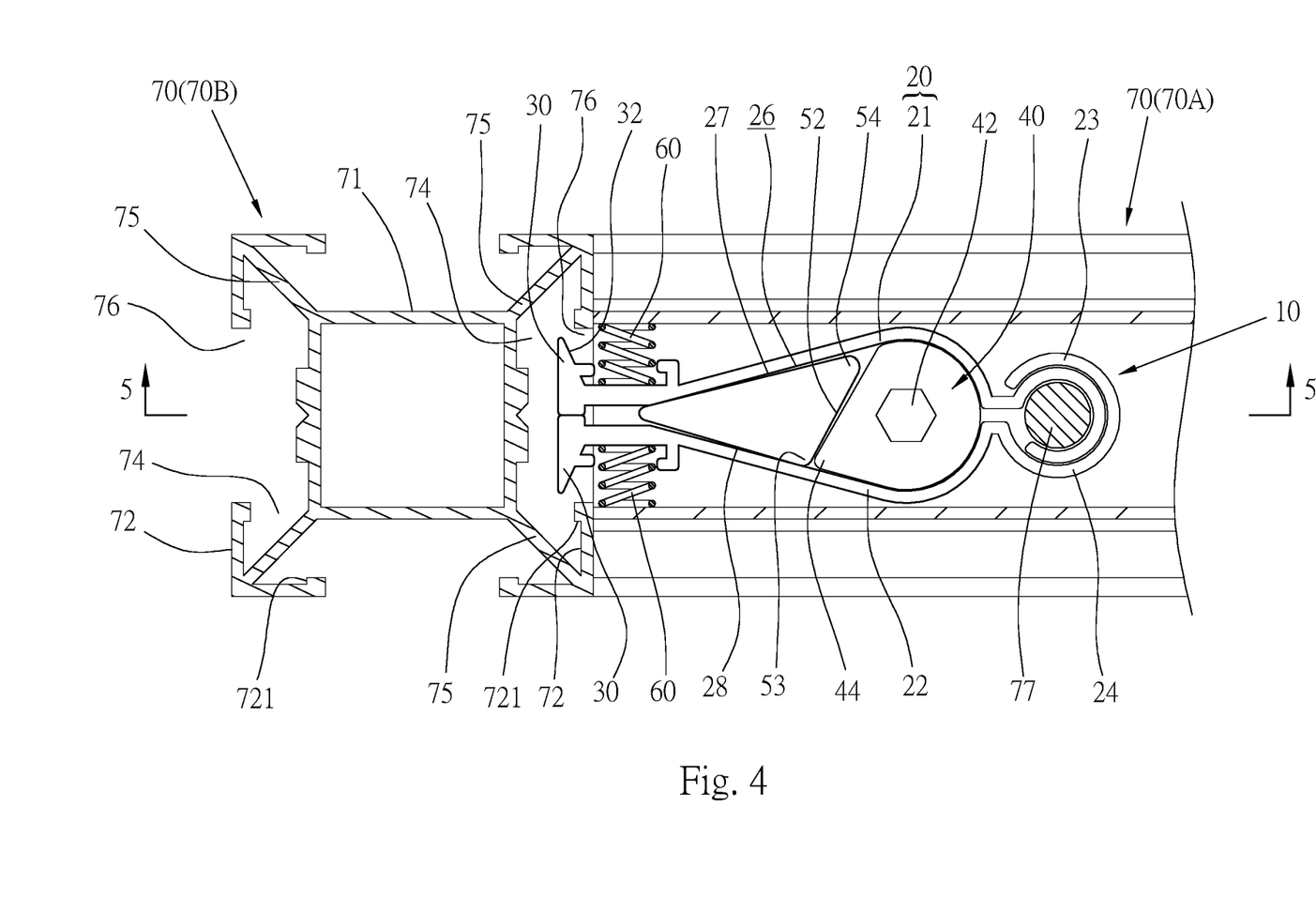
FIG. 4 is a cross sectional view of a preferred embodiment of the connecting apparatus of the present invention installed at one end of an elongated member, and shows an operating state where a vertical elongated member is connected to a horizontal elongated member with each other.

FIG. 1 and FIG. 2 show a connecting apparatus 10 according to a preferred embodiment of the present invention, used to connect a vertical elongated member and a horizontal elongated member. As shown in FIG. 3 to FIG. 6, a plurality of vertical and horizontal elongated members can be assembled together to form a rack. The elongated member has a cross section of one single shape, and it can be an extrusion, pipe or beam. In this embodiment, the elongated member uses the example of an aluminum extrusion for illustration. The connecting apparatus 10 comprises the following members:

A main body 20 includes a first half member 21 and a second half member 22 arranged side by side. The two half members 21, 22 are in a slab shape and having a first end and second end respectively; the first ends of the two half members are pivotally connected to each other via a circular portion 23, 24, allowing the two half members to take the two circular portions 23, 24 as the center for opening and closing relatively to each other, such that the second ends of the two half members are able to expand outward or closing relatively to each other. The internal of the main body 20 includes a curved wall and a slanted wall arranged from the first ends toward the second ends, allowing the driving member 40 described in the following to angular displacement inside the main body 20 and allowing the actuating member 50 described in the following to move inside the main body. The middle sections of the two half members 21, 22 are configured to have a bulged shape, allowing the two half members to be spaced apart from each other. An accommodating cavity 26, as shown in FIG. 4, is formed between the middle sections of the first and second half members 21, 22. The inner side surfaces 27, 28 of the two half members 21, 22 are slanted surfaces, such that a distance (i.e. the width of the accommodating cavity 26) between the inner side surfaces 27, 28 of the two half members 21, 22 is decreased from the first ends of the two half members toward the second ends thereof. The second end of the two half members 21, 22 is an opening end of the main body 20. Two latch portions 30 are arranged at the second ends of the two half members respectively and extend outwardly from the second ends of the two half members respectively and form wedge shapes. Each one of the latch portions 30 includes a slanted latching surface 32, and each one of the latching surfaces 32 face toward the first ends of the two half members.

A driving member 40 and an actuating member 50 are installed inside the accommodating cavity 26. The driving member 40 is arranged adjacent to the first ends of the two half members 21, 22. The actuating member is arranged adjacent to the second ends of the two half members.

Figure 6:
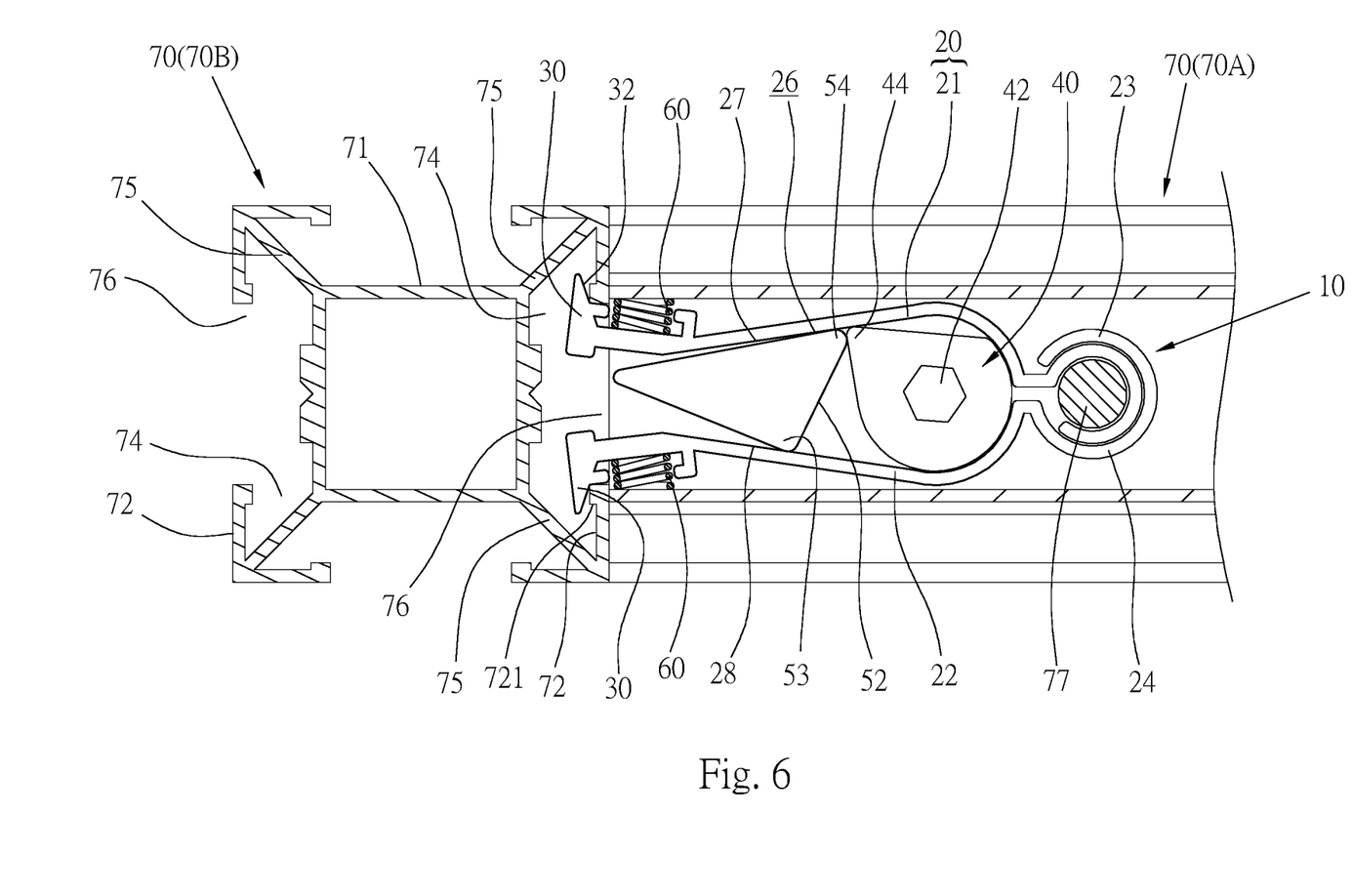
FIG. 6 shows a state where the connecting apparatus of FIG. 4 latches onto another elongated member.

The center of the driving member 40 has an operating portion 42, and a circumferential surface of the driving member has a cam portion 44 formed thereon. The distance from the cam portion 44 to the operating portion 42 has a longest distance. The actuating member 40 is in contact with the curved walls of the two half members 21, 22, and is rotatable inside the accommodating cavity 26 of the main body 20. The cam portion 44 is toward the actuating member 50. The operating portion 42 is provided to allow the operator to rotate the driving member 40. It can be understood that any bulged or recessed structure or any shaped portion capable of rotating the driving member 40 can be used as the operating portion 42. In this embodiment, the operating portion 42 is a polygonal hole (such as a hexagonal hole), capable of allowing a tool (such as a hexagonal wrench) to be inserted therein, in order to rotate the driving member to the disengaged position as shown in FIG. 4, and to rotate to the actuated position as shown in FIG. 6.

The two sides of the actuating member 50 are in contact with the inner walls 27, 28 of the two half members 21, 22, and the actuating member 50 is capable of moving inside the accommodating cavity 26, such that it can move toward the first ends of the two half members 21, 22 to reach a retracted position and move toward the second ends of the two half members to reach an opened position. The width of the two sides of the actuating member 50 is not equal, and the width decreases from the first ends of the two half members 21, 22 toward the second ends of the two half members. In other words, a front end of the actuating member is a narrow end facing toward the second ends of the two half members 21, 22. A rear end of the actuating member 50 is a wide end facing toward the first ends of the two half members 21, 22. A contact portion 52 arranged at the circumferential surface of the actuating member 50 and facing toward the driving member 40 (i.e. the contact portion 52 is arranged at the rear end of the actuating member). The contact portion 52 can be planar or other configurations, and its two sides are a lower side 53 and an upper side 54 respectively. When the driving member 40 is located at the disengaged position, the actuating member 50 is located at the retracted position, as shown in FIG. 4, and the cam portion 44 of the driving member 40 corresponds to the lower side 53 of the contact portion 52. When the driving member 40 is located at the actuated position, it drives the actuating member 50 to move to the opened position as shown in FIG. 6, making the second ends of the two half members to expand outward. At this time, the came portion 44 of the driving member 40 is located at the upper side 54 of the contact portion 52.

A predetermined number of elastic members 60, in this embodiment, there are two elastic members 60 having one end elastically abutted against the outer walls of the two half members 21, 22 respectively. The elastic force of the two elastic elements 60 are able to maintain the second ends of the two half members to be closed. The outer walls of the second ends of the two half members 21, 22 have a base portion 29 respectively, provided to allow one end of the two elastic members 60 to be positioned thereon.

Figure 3:
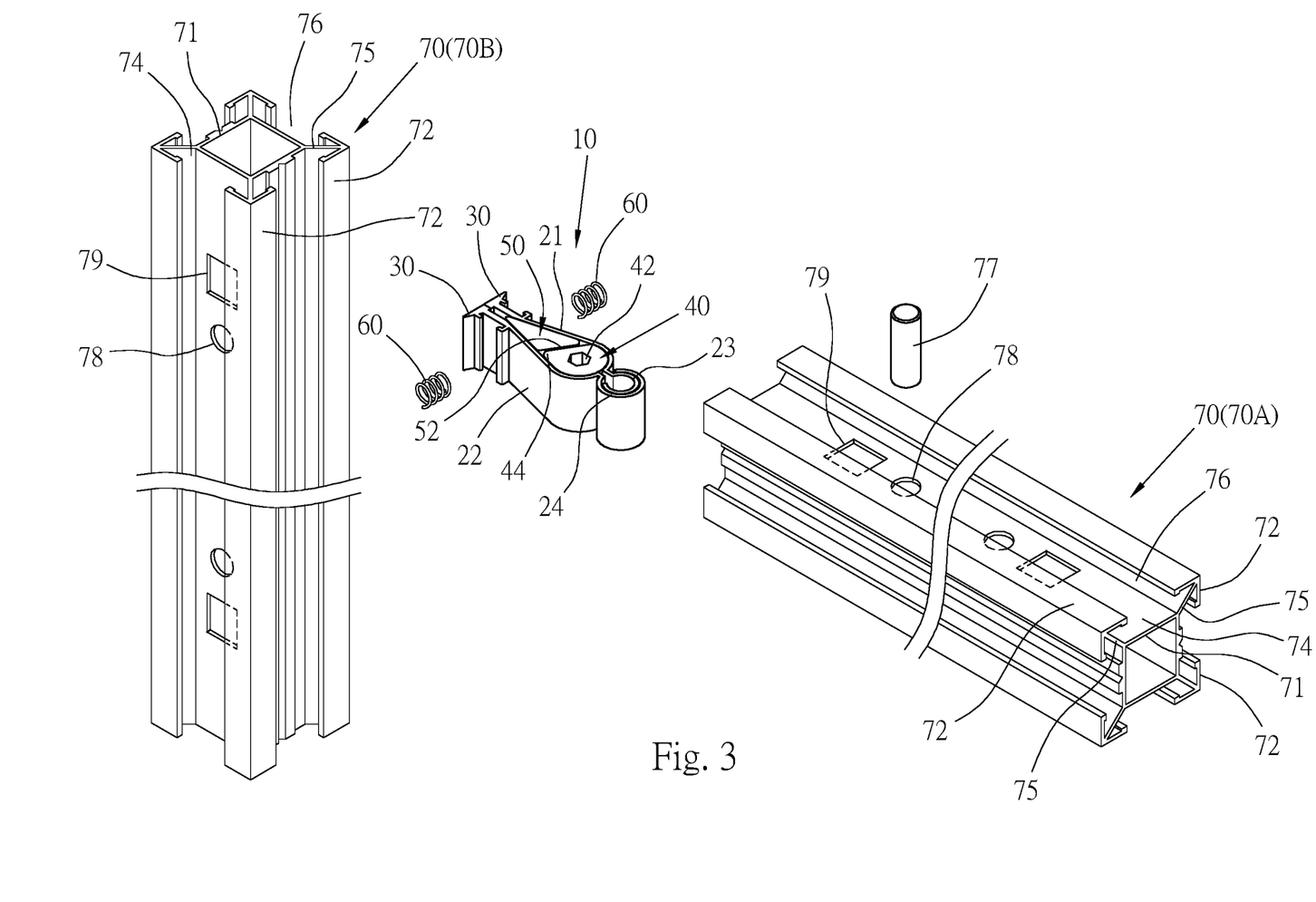
FIG. 3 shows a preferred embodiment of the connecting apparatus of the present invention and shows a vertical and a horizontal elongated member.
Figure 7:
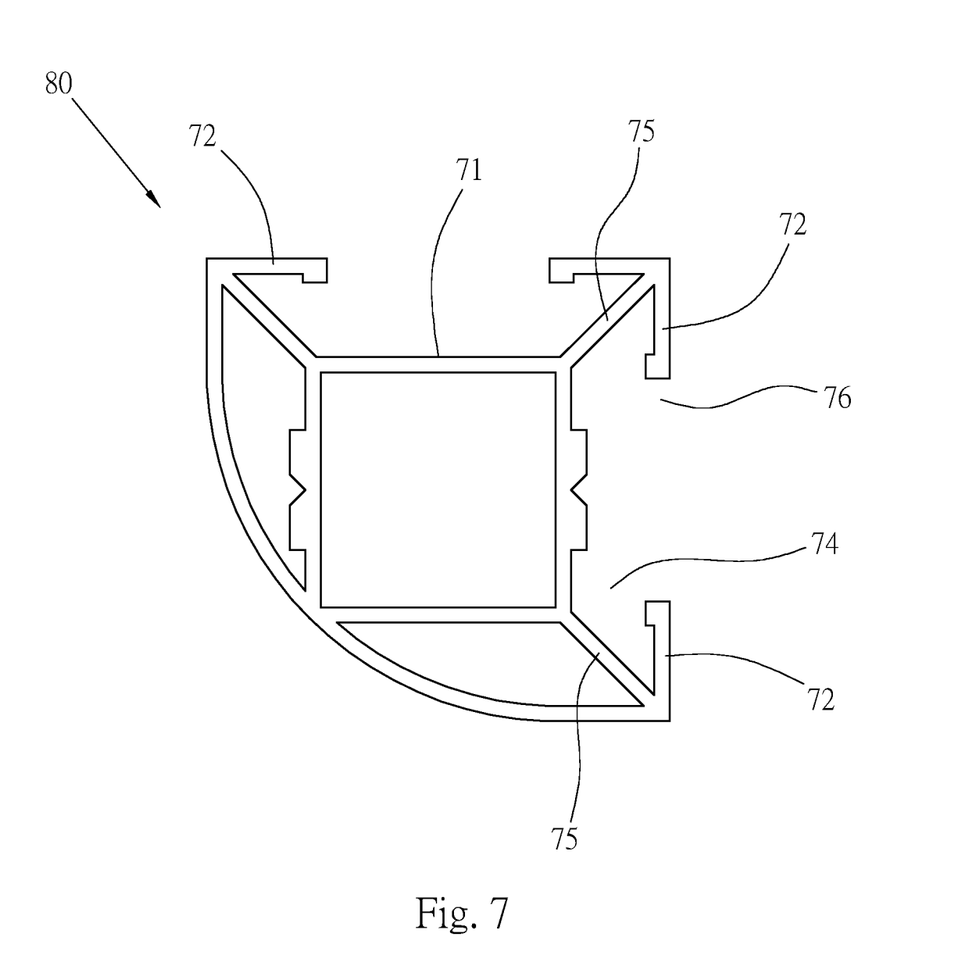
FIG. 7 is a cross sectional view of another preferred embodiment of an elongated member of the present invention.

The connecting apparatus 10 of the present invention is installed inside an elongated member. As shown in FIG. 3 and FIG. 4, the connecting apparatus 10 is installed at one end of an elongated member 70. The elongated member 70 has a uniform cross-sectional shape, and the cross-sectional shape has a hollow inner frame 71; and at least a pair of outer flanges 72 facing each other and arranged on at least one side surface of the inner frame 71. A space 74 is formed between each pair of the outer flanges 72 and the inner frame 71. The elongated member 70 shown in FIG. 3 includes four pairs of outer flanges 72. The elongated member 70 includes a rectangular inner frame 71 and four ribs 75 extending outward from the four corners of the inner frame 71 respectively. The four pairs of outer flanges 72 are arranged at the free end of the four ribs 75 respectively. An opening 76 is formed between the inner ends of each pair of outer flanges 72. FIG. 7 shows another embodiment of the elongated member 80, and identical component signs are used for the same members. The elongated member 80 has two pairs of outer flanges 72 located at two side surfaces of the elongated member, and a space 74 is formed between each pair of outer flanges 72 and the inner frame 71. In addition, the free end (inner end) of each outer flange includes a hook edge 721 formed thereon in order to increase the connecting force between the latch portion 30 and the outer flange 72.

Figure 5:
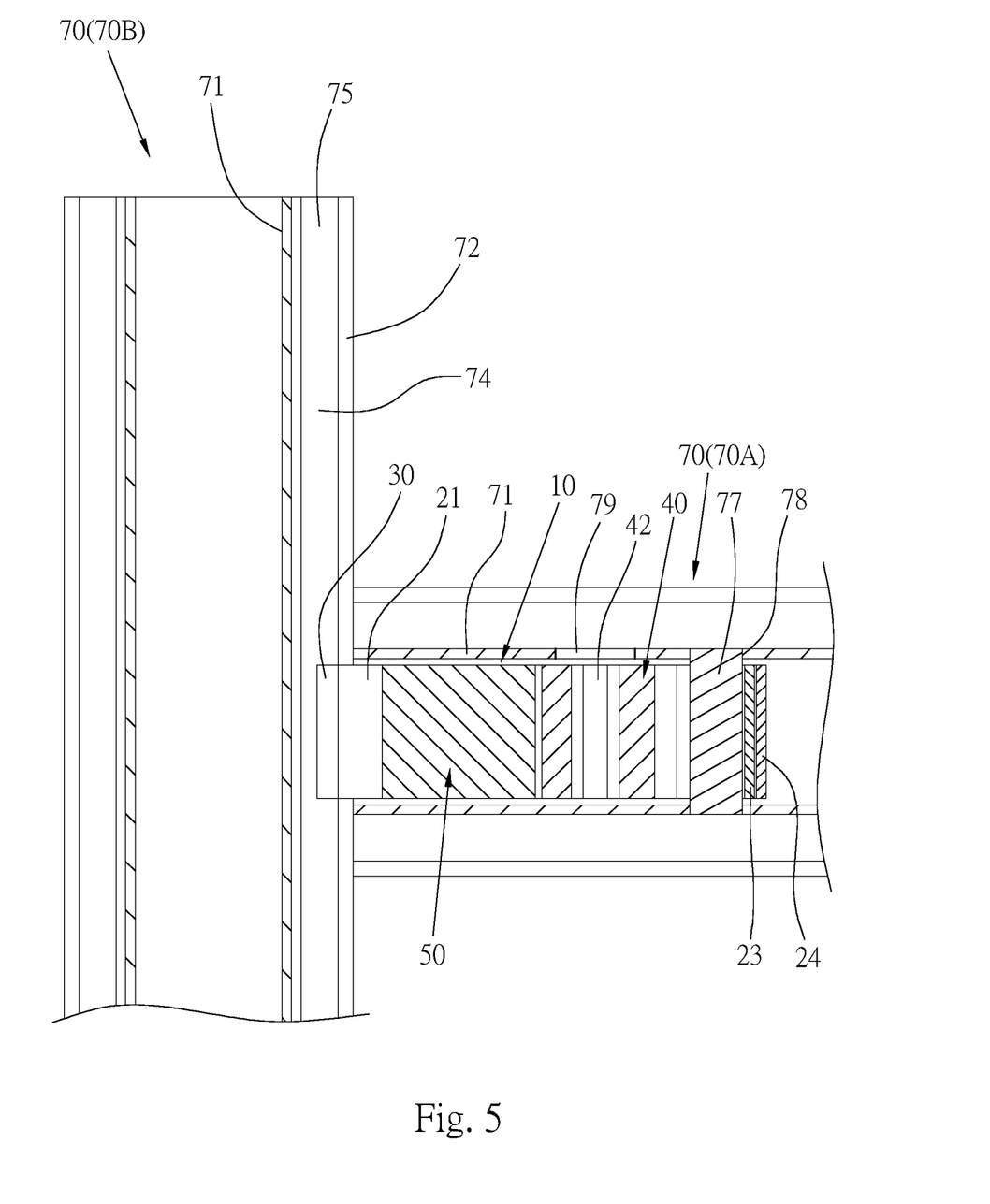
FIG. 5 is a cross sectional view taken along line 5-5 of FIG. 4.

Please refer to FIG. 4 and FIG. 5, the connecting apparatus 10 is installed at one end of the inner frame 71 of the elongated member 70, and a pivotal member 77, such as a pin or screw, is used to penetrate into the circular portions 23, 24 of the two half members 21, 22, so that the first end of the main body 20 is installed at a connection hole 78 of a wall of the inner frame 71 in order to position the connecting apparatus 10 to be positioned in the elongated member 70. The operating portion 42 of the driving member 40 is exposed at an opening hole 79 on a wall of the inner frame 71, allowing a tool to be inserted into the operating portion 42. The outer end of each one of the elastic members 60 abuts against the inner frame 71, and its inner end abuts against the corresponding half member. The latch portions 30 extend and expose out of one end of the elongated member 70.

Please refer to FIG. 4, showing a horizontal elongated member 70A connected to a vertical elongated member 70B, one end of the horizontal elongated member 70A is installed with a connecting apparatus 10. Prior to connection, the driving member 40 of the connecting apparatus 10 is located at the disengaged position, and the actuating member 50 is located at the retracted position. The two elastic members 60 are able to maintain the second ends of the two half members 21, 22 to be closed. At this time, a width formed by the two latch portions 30 at the second end of the main body 20 is smaller than a width of the opening 76 at one side surface of the elongated member 70B.

During connection, one end of the horizontal elongated member 70A is attached to a pair of outer flanges 72 at one side of the vertical elongated member 70B, and the two latch portions 30 of the connecting apparatus 10 penetrates into the space 74 at one side of the elongated member 70B from the opening 76 between the two outer flanges 72.

Next, a tool (not shown in the drawings) is inserted into the operating portion 42 of the driving member 40 and the driving member 40 is rotated to the actuated position, as shown in FIG. 6. The cam portion 44 of the driving member 40 moves from the lower side 53 of the contact portion 52 of the actuating member 50 to the upper side 54, thereby driving the actuating member 50 to move to the opened position. At this time, the second ends of the two half members 21, 22 are opened by the actuating member 50, allowing the two latch portions 30 to expand outward, such that the latching surfaces 32 are latched onto the free ends of the two outer flanges 72. Consequently, the connection between the two elongated members 70A, 70B is complete. With the slanted surface design of the latching surfaces 32, the two elongated members 70A, 70B are able to attach to each other closely. Under the condition shown in FIG. 6, the driving member 40 is maintained at the actuated position in position such that it is able to ensure that the connecting apparatus 10 is latched onto the two elongated members.

To disengage the two elongated members 70A, 70B, the driving member 40 is restored to the disengaged position as shown in FIG. 4, such that it does not abut against the upper side 54 of the actuating member 50 anymore. The elastic force of the two elastic members 60 is able to push the second ends of the two half members 21, 22 to close. The actuating member 50 then moves toward one wider end of the accommodating cavity 26, i.e. moves toward the first ends of the two half members to reach the retracted position. The connecting apparatus 10 is then restored to the state shown in FIG. 4. At this time, the two latch portions 30 are no longer latched onto the two outer flanges 72 of the elongated member 70B, thereby allowing the two elongated members 70A, 70B to separate from each other.

The connecting apparatus 10 of the present invention has the merits of reasonable actuation, convenient operation and is able to achieve fast connection of horizontal and vertical elongated members as well as to achieve fast disengagement of the connection.

Furthermore, the connecting apparatus 10 of the present invention is concealed inside the elongated member such that the connecting apparatus is not visible from the appearance of the elongated member in order to achieve appealing appearance.

It is to be understood that the above description is only preferred embodiments of the present invention and is not used to limit the present invention, and changes in accordance with the concepts of the present invention may be made without departing from the spirit of the present invention, for example, the equivalent effects produced by various transformations, variations, modifications and applications made to the configurations or arrangements shall still fall within the scope covered by the appended claims of the present invention.

What is claimed is:

1. A connecting apparatus, comprising:
a main body having a first half member and a second half member arranged side by side, each of the two half members having a first end and a second end; the two half members configured to open or close relatively to allow the second ends of the two half members to expand outward; an accommodating cavity formed between the first half member and the second half member; two latch portions formed at the second ends of the two half members respectively;
a driving member and an actuating member installed inside the accommodating cavity of the main body; the driving member arranged adjacent to the first ends of the two half members, and the actuating member arranged adjacent to the second ends of the two half members; the driving member configured to rotate against the actuating member between an actuated position and a disengaged position; the actuating member configured to move toward the first ends of the two half members to reach a retracted position and to move toward the second ends of the two half members to reach an opened position; wherein when the driving member is located at the disengaged position, the actuating member is located at the retracted position; wherein when the driving member is located at the actuated position, the actuating member is driven to move to the opened position and make the second ends of the two half members expand outwardly; and
a predetermined number of elastic members having an elastic force capable of maintaining the second ends of the two half members to be closed.

2. The connecting apparatus as claimed in claim 1, further comprising an operating portion arranged on the driving member and used to rotate the driving member; a cam portion arranged at a circumferential surface of the driving member and facing toward the actuating member; the driving member being rotatable inside the accommodating cavity; wherein when the driving member is rotated to the actuated position, the cam portion drives the actuating member to move to the opened position.

3. The connecting apparatus as claimed in claim 2, further comprising a contact portion arranged on the actuating member and facing toward the driving member; two sides of the contact portion configured to be an upper side and a lower side; wherein when the driving member reaches the actuated position, the cam portion moves to the upper side of the contact portion.

4. The connecting apparatus as claimed in claim 1, wherein a distance between inner side surfaces of the two half members decreases from the first ends of the two half members toward the second ends.

5. The connecting apparatus as claimed in claim 4, wherein the inner side surfaces of the two half members are slanted surfaces.

6. The connecting apparatus as claimed in claim 1, wherein a width of two sides of the actuating member decreases from the first ends of the two half members toward the second ends of the two half members.

7. The connecting apparatus as claimed in claim 1, wherein the first ends of the first half member and the second half member are pivotally connected to each other, and the second ends of the two half members use the first ends as a center for expanding outward or closing.

8. The connecting apparatus as claimed in claim 1, wherein the two latch portions extend from the second ends of the two half members to an outer side respectively and form wedge shapes.

9. The connecting apparatus as claimed in claim 1, wherein the elastic members comprise two elastic members arranged at an outer side of the two half members respectively.

10. The connecting apparatus as claimed in claim 1, further comprising an elongated member with a cross-sectional shape of a hollow inner frame; at least a pair of outer flanges facing each other and arranged on at least one side surface of the inner frame; a space formed between each pair of the outer flanges and the inner frame; an opening formed between inner ends of each pair of the outer flanges; the connecting apparatus installed at one end of the inner frame of the elongated member; the two latch portions exposed out of the elongated member.

11. The connecting apparatus as claimed in claim 10, wherein the first ends of the two half members are connected to the inner frame by at least one pivotal member; an operating portion is arranged on the driving member and is used to rotate the driving member; an opening hole is formed at a wall of the inner frame and is arranged correspondingly to the operating portion of the driving member.

12. The connecting apparatus as claimed in claim 11, wherein the elastic members comprise two elastic members arranged at an outer side of the two half members respectively; one end of each one of the elastic members abuts against the inner frame and another end thereof abuts against the corresponding half member.

13. The connecting apparatus as claimed in claim 10, wherein when the two half members are closed, a width formed by the two latch portions is smaller than a width of the opening.

14. The connecting apparatus as claimed in claim 13, wherein the elastic members comprise two elastic members arranged at an outer side of the two half members respectively; one end of each one of the elastic members abuts against the inner frame and another end thereof abuts against the corresponding half member.

15. The connecting apparatus as claimed in claim 10, wherein the elastic members comprise two elastic members arranged at an outer side of the two half members respectively; one end of each one of the elastic members abuts against the inner frame and another end thereof abuts against the corresponding half member.

* * * * *